ABBREVIATED_HEADER 3,251,422
APPARATUS FOR THE AUTOMATIC CONTROL OF THE SPEED OF A FARM-TRACTOR DURING FIELD WORK, PARTICULARLY DURING PLOWING
Erwin Allgaier, Goppingen, Wurttemberg, and Kaspar Ritter, Kirchheim (Teck), Germany, assignors to Kopat Gesellschaft fur Konstruktion, Entwicklung und Patentverwertung m.b.H., & Co. K.G., Goppingen, Germany, a corporation of Germany
Filed June 28, 1963, Ser. No. 291,525
Claims priority, application Germany, July 25, 1962, K 47,330
6 Claims. (Cl. 172—4)

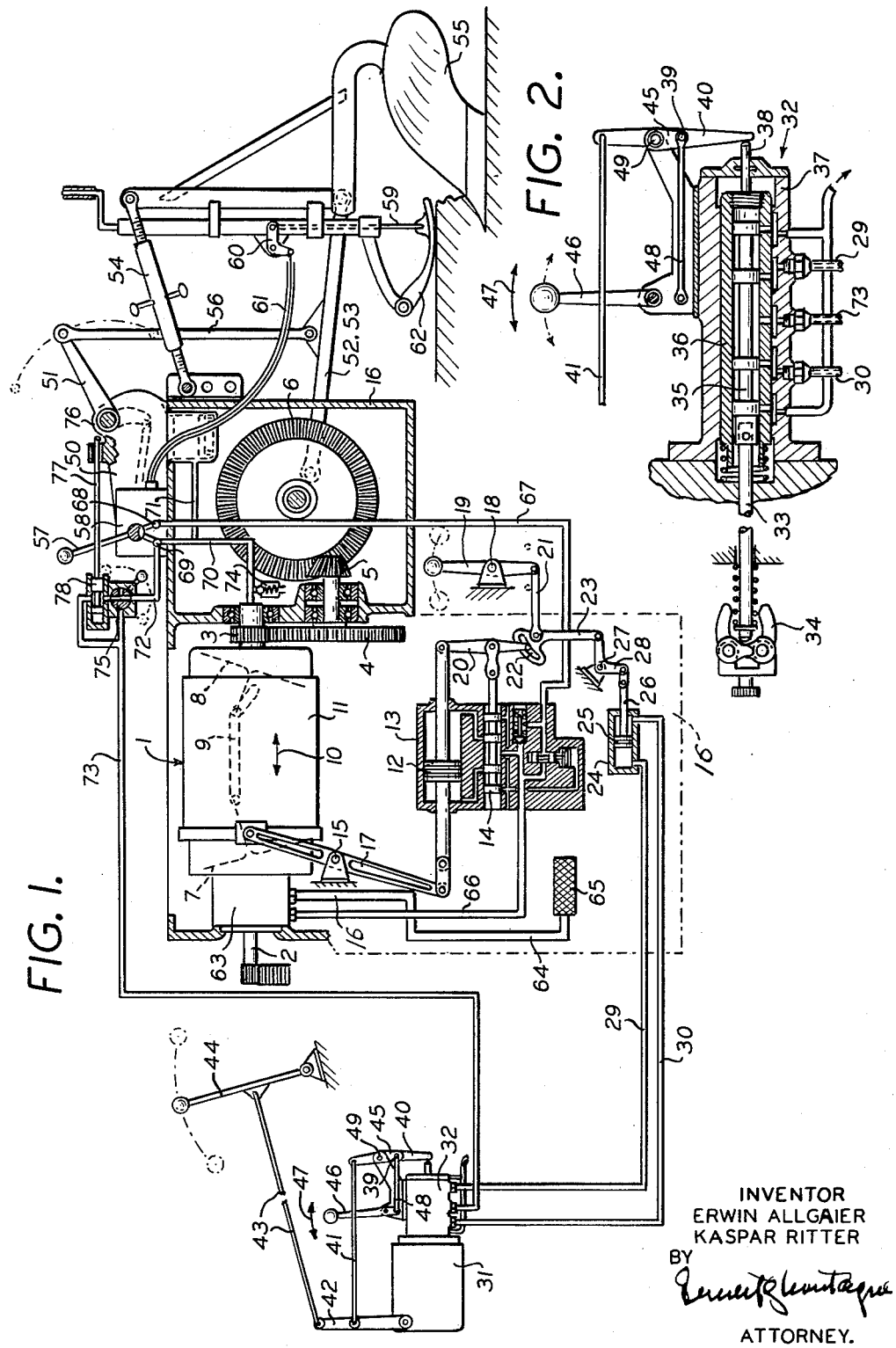

The present invention relates to an apparatus for the automatic control of the speed of a farm-tractor during field work, particularly during plowing.

The known devices of this type use generally a so-called tractive power control. By this manner of control, the depth of penetration of the operating device is changed with different soil resistances in dependency upon the tractive power exerted upon the tractor by means of a hydraulic power lifter by automatic lifting and lowering, respectively, of the operating device such, that the tractive power remains as much as possible constant. In this manner, the required motor power can also be maintained approximately constant, however, only with the undesirable side effect that the soil to be worked, for instance, during plowing, is loosened to a lesser depth only on the more solid places compared with those places, which are already loosened. For tractors, which are equipped with a continuously controllable drive, as disclosed for instance in U.S. Patent No. 2,687,049 to Heinrich Ebert, as a substitute for the conventional shifting drive, it has been proposed before to change the transmission ratio in the drive automatically, for instance, in dependency upon the prevailing quantity of injected fuel, such that an equalized motor output is brought about. Finally, arrangements for the automatic control of an operating device on a farm-tractor are known, which operate with equal soil penetration depth, namely so-called "depth controls." In connection with such automatic "depth controls" greater variations in the required tractive output cannot be avoided, which required the driving of the tractor motor with a comparatively low median load, in order to have available continuously a sufficient output reserve for those places of a highest soil-resistance.

It is, therefore, one object of the present invention to provide a control device for the control of the speed of a farm-tractor, which permits operation of the tractor motor during the field work, particularly during plowing, with an equal penetration depth automatically and continuously with its most economical output and, thereby, to increase the achievable area output in relation to the required working time, as well as in relation to the fuel consumption.

It is another object of the present invention to provide a control device for the control of the speed of a farm-tractor, which control device amounts to a combination of the following known elements:

(a) Formation of a torque converter between the tractor motor and the axle drive as a continuously controllable drive, preferably in form of a hydrostatic drive, which is known per se, (b) Automatic control of the transmission ratio in the drive to a constant motor output, which is brought about in known manner by changing the quantity of fuel injection, and (c) Equipment of the tractor with a device for automatic control of the operating device to an equalized soil penetration depth.

By the combination of the three known elements, it is brought about that, on the one hand, an equalized penetration depth is achieved independently from all variations of the soil resistance. Simultaneously, by the automatic accommodation of the transmission ratio in the continuously controllable drive to the changeable soil-resistance, a permanent drive of the tractor motor within the range of its best useful output and, thereby, of highest economy is possible.

It is another object of the present invention to provide an apparatus for the automatic control of the speed of a farm-tractor during field work, wherein a single pressure pump is used not only for the maintenance of the required filling pressure within the inner cycle of the continuously controllable drive, but also for the delivery of the working fluid for the operation of all control members moved by an auxiliary force. By such arrangement, the additional power for the automatic control is appreciably reduced due to multiple use of the pressure pump and, thereby, the entire device is simplified, and, simultaneously, its economy is correspondingly increased.

In order to switch on and off, respectively, the automatic control suitably only during the field work, particularly during plowing, at any time at will and quickly, a manually operated switching member is provided in accordance with the present invention, in order to render operative and inoperative, respectively, the automatic drive adjustment in its pressure fluid conduit.

It is yet another object of the present invention to provide an apparatus for the control of the speed of a farm-tractor, wherein, in addition to the manually operable switching member, a valve member for the automatic switching on and off of the automatic drive adjustment is arranged in its pressure fluid conduit, which valve member is operable in dependency upon the position of the power lifter serving the movement of the operating device. By this arrangement, during lifting of the operating device, for instance, for turning at the end of the field, the automatic control gear adjustment is automatically shut off and, thereby, the operator of the tractor is released from any additional manual operation, which would otherwise be necessary, in order to prevent an undesirable acceleration of the tractor during turning.

It is still also another object of the present invention to provide an apparatus for the automatic control of the speed of a farm-tractor, wherein the control device is arranged advantageously such, that the nominal value of the motor load taken by means of linkage of an injection pump regulator is transmitted by means of a servo operating with a relatively low filling pressure to the operation linkage of a high pressure adjustment device for the continuously controllable drive. The relatively low filling pressure of, for instance, 5 to 7 atm. in the working fluid for the transmission of the differences between the control nominal and actual values on the adjustment device for the continuously controllable drive suffices completely, in order to overcome the very low control forces by means of control devices requiring likewise very small measurements and results simultaneously into a reduction of all friction forces occurring at all sealing faces.

It is yet a still further object of the present invention to provide an apparatus for the automatic control of the speed of a farm-tractor, wherein the control device comprises finally an arrangement, according to which the effective value giver is designed as a slide and is centrically within a nominal value giver formed as a hollow cylinder slide and likewise longitudinally movable in a housing. This formation of the givers for the servo for the automatic adjustment of the continuously operating drive makes possible a completely closed structure of this device, which is rigidly secured to a controller for the number of revolutions and is connected by means of rigid conduits with the pressure fluid source, as well as with the working cylinder, whereby only one housing penetration to be sealed is required for the movement of the effective value giver.

With these and other objects in view, which will become apparent in the following detailed description, the present invention will be clearly understood in connection with the accompanying drawing, in which:

FIGURE 1 is a diagrammatic showing, partly in section, of the control device; and FIG. 2 is a longitudinal section through the giver device for the automatic adjustment of the continuously operating drive, at an enlarged scale.

Referring now to the drawing, the control device comprises the following main elements cooperating with each other:

A known continuously controllable drive 1, as disclosed in U.S. Patent No. 2,687,049 to Ebert, is formed as a hydraulic torque converter in the form of an axial piston structure, the input shaft 2 of the drive 1 being driven by a motor shaft of a tractor (not shown), while its drive pinion 3 is operatively connected with drive gears (not shown) by means of the reduction gears 3, 4 and 5, 6. The ratio between the input shaft 2 and the output pinion 3 of the drive 1 can be continuously changed at a wide range by means of swinging bodies 7 and 8, respectively, which are mounted in the housing and are shown in dotted lines. The adjustment of the swinging bodies 7 and 8 takes place by means of a sliding sleeve 11, which is longitudinally movable and is equipped with control slots 9 and movable in the direction of the double arrow 10. The slide sleeve 11 is in turn adjustable by means of a working piston 12 subjected to a comparatively high pressure of a known power adjustment device 13, as disclosed in U.S. Patent No. 3,046,744 to Ritter, with a return guide device and which is equipped with a swingable switching lever 17 pivotally mounted in the driving housing 16 at the pivot 15 in accordance with the position of a switching lever 19 which is swingably mounted about an immovable bearing pin 18 for a selective change of the transmission ratio.

The switching lever 19 and the operating lever 20 of the servo-adjustment device 13 are connected by means of a buffer bar 21 and a further transmission element 23 having a slot guide 22, such that the operating lever 20 can be adjusted in any position either by means of the switching lever 19 or by means of a piston 25 having a piston rod 26 moving in a cylinder 24 over a double-armed lever 28 mounted immovably but swingably at a pivot 27. The fluid chambers in the working cylinder 24 on both sides of the piston 25 communicate by means of pressure fluid conduits 29 and 30 with a control device 32 secured to any conventional motor regulator 31 for the automatic regulation of the transmission ratio in the drive 1 for a motor output which remains unchanged. The motor regulator 31 can comprise fly-weights which adjust in response to the number of revolutions of the fuel injection pump, in order to maintain an always predetermined number of revolutions during load variations to greater and smaller amounts, respectively, of fuel injections.

As can be ascertained from FIG. 2 of the drawing, the control device 32 comprises a nominal value giver formed as a side valve 35 which is connected with a control rod 33 of governor 34 controlling the number of revolutions of the motor, which nominal value giver is disposed within an actual value giver 36 formed as a hollow slide and likewise longitudinally movable in a housing 37. The actual value giver is in connection with a setting lever 42 serving the purpose of changing the spring tension of the governor by means of an extension member 38 projecting from the housing 37, a double-armed lever 40 swingable about a pivot 39 and linkage 41, which setting lever 42 in turn is adjustable over a further rod 43 by means of a manually or foot-operated revolution-selection lever 44. For the pre-selection of a desired transmission ratio, in accordance with the required median tractive power of the tractor required for the particular work to be formed, the bearing pin 39 is disposed on an intermediate lever 45, which is swingable by operation of the tractive power selection lever 46 in one or the other direction of the double-arrow 47 by means of linkage 48 about an immovable pivot point 49.

Furthermore, a conventional hydraulic power lifter 50 having lifting arms 51 is secured to the drive housing 16, which power lifter 50 serves the lifting and lowering, respectively, of a plough 55 suspended on a three-point linkage 52, 53 and 54, by means of a connection rod 56. The feeding and return of pressure fluid into and out, respectively, the pressure chamber of the power lifter 50, can be controlled automatically to a permanent working depth either by a manually operable slide or valve 57 disposed in the control device 58 of the power lifter 50 or by means of a rod 59 which operates a lever 60 and the latter connected with a Bowden cable 61, which is controlled by a sensing member 62 adjustable for different soil-penetration depth of a plough 55.

All hydraulic devices of the described control apparatus are fed from a single pressure pump 63, which is driven by the input shaft 2 of the drive 1 and the working fluid is sucked up by means of a suction conduit 64 having a coarse filter 65 from the sump of the drive housing 16. The working fluid is fed from the pressure pump 63 at first to the servo-adjusting device 13 for the drive 1 through the conduit 66. The working fluid is then fed by means of a connecting conduit 67 from the servo-adjusting device 13 to the input branch 68 of the control device 58 on the power lifter 50. If the power lifter 50 is standing still, the pressure fluid is finally fed from the output branch 69 by means of a further conduit 70 to the hydrostatic drive 1, in order to replace working fluid which has leaked from its inner circulation cycle due to leakage losses and is fed for lubrication. During the operational cycle of the power lifter 50 a quantity of pressure fluid corresponding to the filling volume of the working chamber is fed from the crank housing of the power lifter 50, which is always filled with pressure fluid, by means of a conduit 71 and a conduit 70 to the drive 1.

The automatic drive adjustment is connected with the pressure conduit system by means of the pressure conduits 72 and 73 leading from the output branch 69 of the control device 58 for the power lifter 50 to the control device 32 and the working cylinder 24 with the piston 25, which pressure conduit system is continuously maintained by the pressure pump 63 with a controllable filling pressure by setting a relief valve 74. A manually operable three-way cock 75 and a slide valve 78, automatically adjustable by the load arm 51 of the power lifter 50 in its lifting position by means of a cam 76 and a rod 77, are disposed between the conduits 72 and 73. The three-way cock 75 and the slide valve 78 serve the purpose of rendering operative and inoperative, respectively, selectively and at any time the automatic drive adjustment and of interrupting, respectively, in the shown position of the three-way cock 75, the automatic drive adjustment automatically always then, when the plough 55 is lifted by means of the power lifter 50, 51 from the shown working position into the transporting position.

The apparatus designed in accordance with the present invention operates in the following manner:

The operation is performed for the automatic control of the traveling speed of an agricultural tractor by example during plowing of earth having varying soil resistance and/or variable steepness during the travel.

At first the inclination of the plow sole controlling the rear axle pressure of the tractor is adjusted at the member 54 of the three-point linkage and the desired soil penetration depth is adjusted by lifting or lowering the sensing member 62 in conventional manner prior to the start of the plowing operation.

Then a favorable median engine load corresponding to the prevailing plowing operation is likewise preselected once only by setting the lever 46 of the control device 32 and the three-way valve 75 is set for automatic operation by providing pressure communication to the plow lifting means. Prior to the start of movement of the tractor the number of revolutions of the engine is increased by manual or pedal operation of the gas pedal 44 and the tractor is then put into forward motion by resetting of the lever 19 without prior operation of a coupling. At one end of the furrow the plow is lowered into working position by operation of the shifting lever 57 for the power lifter 50. During the plowing operation it is merely necessary that the driver maintains the direction of movement of the tractor by operation of the steering wheel (not shown), while any other operation is automatically performed by the present apparatus. The traveling speed is adjusted by automatic change of the transmission ratio in the continuously variable drive 1, in case of variations of the soil resistance in harder or softer layers in the soil, as well as during travel over any steep areas upwardly or downwardly, such that the tractor engine operates with a constant load and a constant number of revolutions. Also the plowing depth is readjusted to the preselected value by the automatic depth adjustment without any manual interference. At the other end of the furrow, the plow is lifted in conventional manner by means of the power lifter 50, whereby simultaneously the automatic drive is shut off by means of the slide valve 78. Then the tractor is moved in the opposite direction into the next adjacent furrow by resetting the lever 19 and by operation of the steering wheel (not shown), again without any coupling operation; whereupon the tractor is moved through the next adjacent furrow in the manner described above in the first furrow.

While we have disclosed one embodiment of the present invention, it is to be understood that this embodiment is given by example only and not in a limiting sense, the scope of the present invention being determined by the objects and the claims.

We claim:
1. An apparatus for the automatic control of the speed of a farm-tractor during field work, particularly during plowing with constant soil penetration depth, comprising
a tractor motor having a motor shaft,
a continuously controllable transmission drive,
first means automatically controlling the transmission ratio of said drive to obtain a constant motor output,
an earth working tool operatively secured to said farm-tractor,
second means secured to said tractor for lifting and lowering, respectively, said earth working tool relative to said tractor, and
additional control means including means for automatically controlling said lifting and lowering means for a constant soil penetration depth of said earth working tool,
a pressure pump, means operatively connecting said pressure pump with said continuously controllable transmission drive and maintaining a required filling pressure in an inner cycle of said transmission drive, and means for operatively connecting said pressure pump with said means for lifting and lowering, respectively, said earth working tool,
said connecting means comprising a conduit system interconnecting said lifting and lowering means with said first control means, and
further means for manually rendering operative and inoperative said automatic control means of said transmission drive, or selectively automatically rendering operative and inoperative said automatic control means of said transmission drive upon lowering and lifting, respectively, said earth working tool.

2. The apparatus, as set forth in claim 1, wherein said further means for manually rendering operative and inoperative, respectively, said automatic control means comprises a manually operated three-way cock disposed in said conduit system between said lifting and lowering means and said first control means.

3. The apparatus, as set forth in claim 1, which includes
an injection pump controller having a rod and secured to the motor of said farm tractor,
a servo-control means operatively connected with said transmission drive, and including a high-pressure adjustment device,
said high-pressure adjustment device including a double-armed lever operatively connected with said servo-control means, and
the nominal value of the motor load taken from said rod of said injection pump controller is transmitted by said servo-control means operating at a low filling pressure to said double-armed lever of said high pressure adjustment device for said continuously controllable transmission drive.

4. The apparatus, as set forth in claim 3, including a nominal value giver comprising a longitudinally movable slide coupled with said control rod, and which includes
an actual value giver and
a housing,
said actual value giver comprising a hollow cylinder slide movable longitudinally in said housing, and
said first mentioned slide being disposed centrically within said hollow cylindrical slide.

5. The apparatus, as set forth in claim 1, wherein said continuously controllable transmission drive comprises a hydrostatic drive.

6. The apparatus, as set forth in claim 1 wherein said automatic control means of the transmission ratio includes means for selectively electing the quantity of injected fuel into said motor.

References Cited by the Examiner
UNITED STATES PATENTS

| | | | |
|---|---|---|---|
| 2,527,840 | 10/1950 | Mott | 172—4 |
| 3,046,744 | 7/1962 | Ritter | 60—53 |
| 3,078,656 | 2/1963 | Jedrzykowski | 60—19 |

FOREIGN PATENTS 1,106,109  5/1961  Germany.

ABRAHAM G. STONE, *Primary Examiner.*

F. B. HENRY, *Assistant Examiner.*